US012222671B2

(12) United States Patent
Nieda et al.

(10) Patent No.: US 12,222,671 B2
(45) Date of Patent: Feb. 11, 2025

(54) IMAGE FORMING APPARATUS

(71) Applicants: Hiroaki Nieda, Kanagawa (JP); Naoki Matsuda, Kanagawa (JP)

(72) Inventors: Hiroaki Nieda, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/387,848

(22) Filed: Nov. 7, 2023

(65) Prior Publication Data

US 2024/0241474 A1 Jul. 18, 2024

(30) Foreign Application Priority Data

Nov. 10, 2022 (JP) ................................ 2022-180632
Sep. 27, 2023 (JP) ................................ 2023-165227

(51) Int. Cl.

*G03G 15/08* (2006.01)
*E05B 47/00* (2006.01)
*G03G 15/00* (2006.01)
*G03G 21/16* (2006.01)

(52) U.S. Cl.

CPC ..... *G03G 21/1633* (2013.01); *E05B 47/0002* (2013.01); *G03G 15/556* (2013.01); *E05B 2047/0067* (2013.01); *E05B 2047/0073* (2013.01)

(58) Field of Classification Search

CPC ......................... G03G 15/556; G03G 21/1653
USPC .................................... 399/9, 24, 25, 27, 35
See application file for complete search history.

(56) References Cited

U.S. PATENT DOCUMENTS 7,343,107 B2 * 3/2008 Fujimaru .......... G03G 15/0862 399/13
9,261,815 B2 * 2/2016 Nakaue .............. G03G 15/0853
2022/0004141 A1 1/2022 Kita et al.

FOREIGN PATENT DOCUMENTS

JP H07-168430 A 7/1995
JP 2011-008142 A 1/2011
JP 2011-059296 A 3/2011
JP 2021-099432 A 7/2021

* cited by examiner

*Primary Examiner* — Hoan H Tran
(74) *Attorney, Agent, or Firm* — XSENSUS LLP

(57) ABSTRACT

An image forming apparatus includes a unit, a housing, an outer cover, a lock, a detector, and circuitry. The unit is disposed in the image forming apparatus. The housing stores a toner bottle and has an insertion opening and an inner cover openably closable the insertion opening. The outer cover is openably closable to expose the inner cover and the unit or cover the inner cover and the unit. The lock locks the inner cover at a closed position. The detector detects an amount of toner remaining in the toner bottle. The circuitry controls the lock to unlock the inner cover based on the amount of the toner detected by the detector.

9 Claims, 8 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Applications No. 2022-180632, filed on Nov. 10, 2022, and No. 2023-165227, filed on Sep. 27, 2023, in the Japan Patent Office, the entire disclosures of which are hereby incorporated by reference herein.

BACKGROUND

Technical Field

Embodiments of the present disclosure relate to an image forming apparatus.

Related Art

One type of image forming apparatus includes a toner bottle attachable to and detachable from an apparatus main body, an inner cover to open and close an insertion opening through which the toner bottle passes, an outer cover, and a lock device. The outer cover is openable and closable with respect to the apparatus main body. The outer cover is closed to cover the inner cover and opened to expose the inner cover. The lock device locks the inner cover at a closed position. When the toner bottle is replaced, the lock device automatically unlocks the inner cover.

SUMMARY

This specification describes an improved image forming apparatus that includes a unit, a housing, an outer cover, a lock, a detector, and circuitry. The unit is disposed in the image forming apparatus. The housing stores a toner bottle and has an insertion opening and an inner cover openably closable the insertion opening. The outer cover is openably closable to expose the inner cover and the unit or cover the inner cover and the unit. The lock locks the inner cover at a closed position. The detector detects an amount of toner remaining in the toner bottle. The circuitry controls the lock to unlock the inner cover based on the amount of the toner detected by the detector.

This specification also describes an improved image forming apparatus that includes a housing, an outer cover, a lock, a detector, an another detector, and circuitry. The housing stores a toner bottle and has an insertion opening and an inner cover openably closable the insertion opening. The outer cover is openably closable to expose the inner cover or cover the inner cover. The lock locks the inner cover at a closed position. The lock includes a locking portion and a locked portion in the inner cover. The locked portion is locked by the locking portion. The locking portion is downstream from the locked portion of the closed inner cover in an opening direction of the inner cover. The locking portion includes a contact portion to contact with the locked portion of the inner cover at the closed position. The detector detects an amount of toner remaining in the toner bottle. The another detector detects an opening of the outer cover from the closed position. The circuitry is configured to control the lock to unlock the inner cover based on the amount of the toner detected by the detector and the opening of the outer cover detected by the another detector. The gap between the inner cover at the closed position and the outer cover at a closed position is smaller than a distance, in the opening direction of the inner cover, between the locked portion of the inner cover at the closed position and the contact portion of the locking portion unlocking the locked portion.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
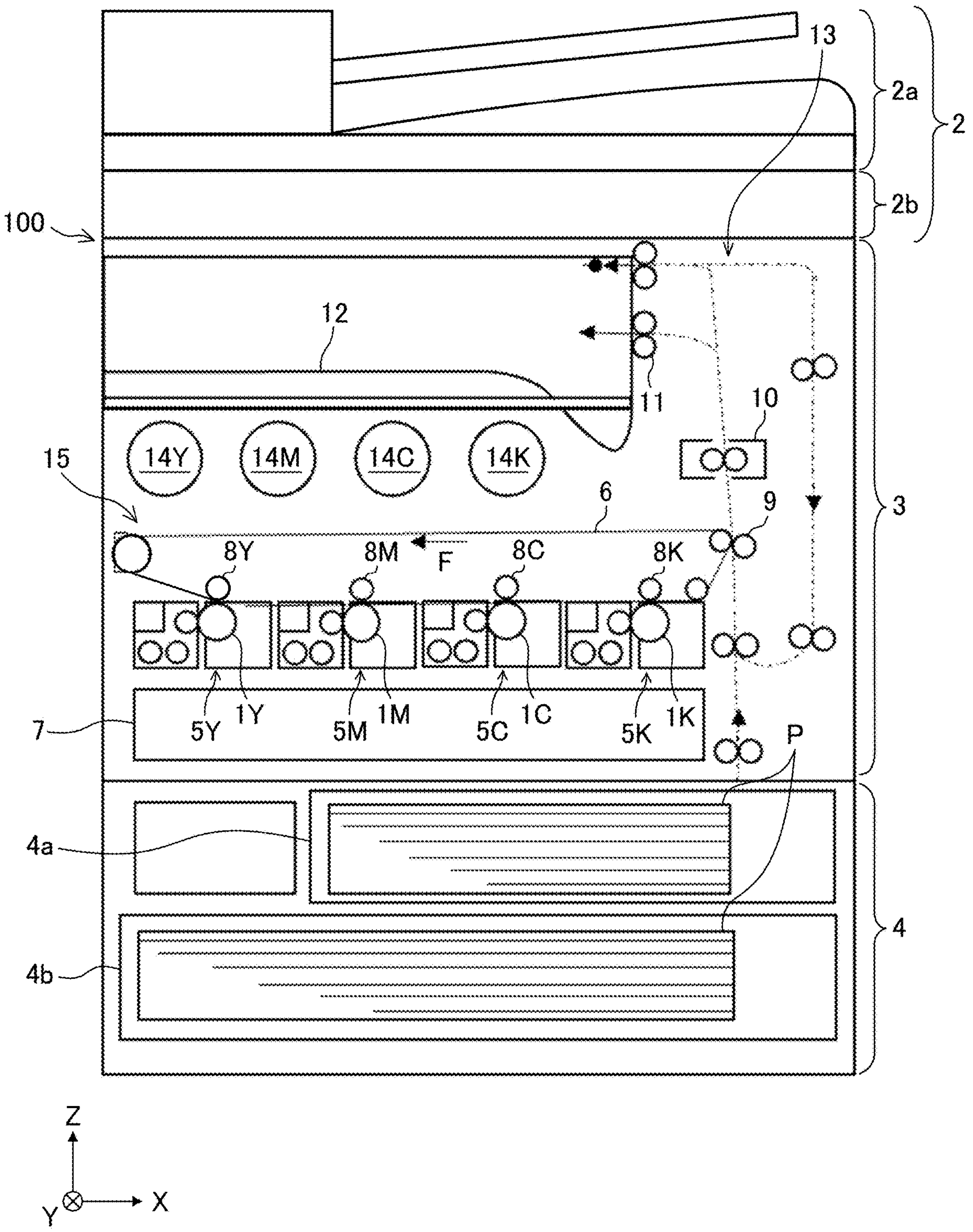
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

The following describes an electrophotographic image forming apparatus according to an embodiment of the present disclosure.

FIG. 1 is a schematic diagram illustrating a configuration of an image forming apparatus 100 according to the present embodiment.

In FIG. 1, a vertical direction in the image forming apparatus 100 is indicated by an arrow Z, a front-back direction in the image forming apparatus 100 is indicated by an arrow Y, and a left-right direction in the image forming apparatus 100 is indicated by an arrow X.

The image forming apparatus 100 includes an image forming section 3, a sheet feeding section 4, and an image reading device 2. The image reading device 2 reads an image of a document as an image forming target. The image reading device 2 is disposed above the image forming section 3 and includes a document feeder 2*a* and a scanner 2*b*. The sheet feeding section 4 is disposed below the image forming section 3 and includes two sheet trays 4*a* and 4*b* for storing sheets P.

The image forming section 3 includes an intermediate transfer unit 15 as a unit including an intermediate transfer belt 6 and four image forming units 5Y, 5M, 5C, and 5K for forming respective color images. The image forming units also serve as units. The intermediate transfer belt 6 rotates in a direction indicated by an arrow F in FIG. 1. The image forming units 5Y, 5M, 5C, and 5K are arranged along the intermediate transfer belt 6. The image forming units 5Y, 5M, 5C, and 5K include photoconductors 1Y, 1M, 1C, and 1K, respectively, as drum-shaped image bearers. In addition, the image forming section 3 includes an exposure device 7.

The intermediate transfer unit 15 includes the intermediate transfer belt 6 having an endless shape and wound around multiple support rollers, primary transfer rollers 8Y, 8C, 8M, and BK, and a belt cleaner to clean the surface of the intermediate transfer belt 6. The primary transfer rollers BY, 8M, 8C, and 8K are disposed inside the loop of the intermediate transfer belt 6 and transfer the toner images from the photoconductors 1Y, 1M, 1C, and 1K onto the intermediate transfer belt 6. A secondary transfer roller 9 is disposed downstream from the primary transfer rollers BY, 5M, 8C, and K in a direction that the intermediate transfer belt 6 moves. The secondary transfer roller 9 faces the intermediate transfer belt 6. In addition, the image forming section 3 includes a fixing device 10 to fix an image onto the sheet P and an output roller pair 11 that are above the secondary transfer roller 9.

The four image forming units 5Y, 5M, 5C, and 5K have a similar configuration except for the color of toner used therein. In the following description, the suffixes Y, M, C, and K are omitted when color discrimination is not necessary. Around the photoconductor 1, the image forming unit 5 includes a charging device to charge the surface of the photoconductor 1 and a developing device to develop a latent image on the photoconductor 1 with toner into a toner image. Additionally, the image forming unit 5 includes a cleaning device to clean the surface of the photoconductor 1 after the toner image is transferred from the photoconductor 1 to the intermediate transfer belt 6.

Operations of the image forming apparatus 100 according to the present embodiment are described below.

In response to receiving a start signal to start image formation, a controller 50 as circuitry in the image forming apparatus 100 controls a driver to start rotating the intermediate transfer belt 6. The driver also starts rotating the photoconductor 1Y to form an yellow toner image, and the charging device in the image forming unit 5Y for forming the yellow toner image uniformly charges the photoconductor 1Y. The exposure device 7 irradiates the photoconductor 1Y with a laser beam to form an electrostatic latent image. The developing device develops the electrostatic latent image to form the yellow toner image on the photoconductor 1Y. Similarly, the image forming units 5M, 5C, and 5K form a magenta toner image, a cyan toner image, and a black toner image on the photoconductors 1M, 1C, and 1K, respectively. With the movement of the intermediate transfer belt 6, the primary transfer rollers 8Y, 8M, 8C, and 8K sequentially transfer the yellow, magenta, cyan, and black toner images from the photoconductors 1Y, 1M, 1C, and 1K to the intermediate transfer belt 6, respectively to form a composite color image on the intermediate transfer belt 6. The controller 50 performs the image forming operations for forming the yellow, magenta, cyan, and black toner images at different timings from the upstream side to the downstream side in the direction that the intermediate transfer belt 6 moves so that the yellow, magenta, cyan, and black toner images are transferred to and superimposed on the same position of the intermediate transfer belt 6.

On the other hand, the sheet feeding section 4 feeds the sheet P from the upper sheet tray 4*a* or the lower sheet tray 4*b*, and conveyance rollers convey the sheet P to a secondary transfer nip formed by the intermediate transfer belt 6 and the secondary transfer roller 9. The secondary transfer roller 9 transfers the composite color image on the intermediate transfer belt 6 onto the sheet P to form a color image on the sheet P. The sheet P bearing the color image is sent to the fixing device 10 to fix the color image onto the sheet P. After the color image is fixed onto the sheet P in the fixing device 10, the output roller pair 11 ejects the sheet P to stack the sheet P on an output tray 12, or the sheet P is sent to a reverse path 13 to form a toner image on the other side of the sheet P.

The cleaning device in each of the image forming units 5Y, 5M, 5C, and 5K cleans residual toner on each of the photoconductors 1Y, 1M, 1C, and 1K after the toner image is transferred. The belt cleaner cleans residual toner on the intermediate transfer belt 6 after the composite color image is transferred.

The above-described image formation consumes toner in each of the developing device. The image forming apparatus 100 includes toner bottles 14Y, 14M, 14C, and 14K filled with yellow, magenta, cyan, and black toners, respectively and illustrated on the upper left side in FIG. 1. A predetermined amount of toner is supplied from each toner bottle to each developing device through a toner conveyance path. The arrangement order of the four image forming units 5Y, 5M, 5C, and 5K and the toner bottles 14Y, 14M, 14C, and 14K is not limited to the example illustrated in FIG. 1. The toner bottle of the present disclosure is not limited to a toner container having a bottle shape. The toner bottle of the present disclosure may have a box shape or may be a toner cartridge.

When the image forming apparatus 100 according to the present embodiment forms a copy of the document, the document having a sheet shape is set on the document feeder 2*a* of the image reading device 2. After the document is set on the document feeder 2*a*, pushing a copy start switch causes the image reading device 2 to start a document reading operation. Specifically, the document feeder 2*a* conveys the document, and the scanner 2*b* reads the document.

In parallel with the document reading operation, the devices in the image forming units 5Y, 5M, 5C, and 5K, the intermediate transfer belt 6, the secondary transfer roller 9, and the fixing device 10 start operations. Based on image data read by the image reading device 2, the exposure device 7 is driven and controlled to form the yellow, magenta, cyan, and black toner images on the photoconductors 1Y, 1M, 1C, and 1K, respectively.

The yellow, magenta, cyan, and black toner images are transferred onto the intermediate transfer belt 6 and superimposed on the intermediate transfer belt 6 to form a four color toner image.

Almost simultaneously with the start of the document reading operation, the sheet feeding section 4 starts a sheet feeding operation. The sheet feeding section 4 includes the sheet trays 4*a* and 4*b* accommodated and overlapped in the image forming apparatus 100. In the sheet feeding operation, one of the sheet trays 4*a* and 4*b* feeds the sheet P. The conveyance rollers convey the fed sheet P toward the secondary transfer nip.

Figure 2A:
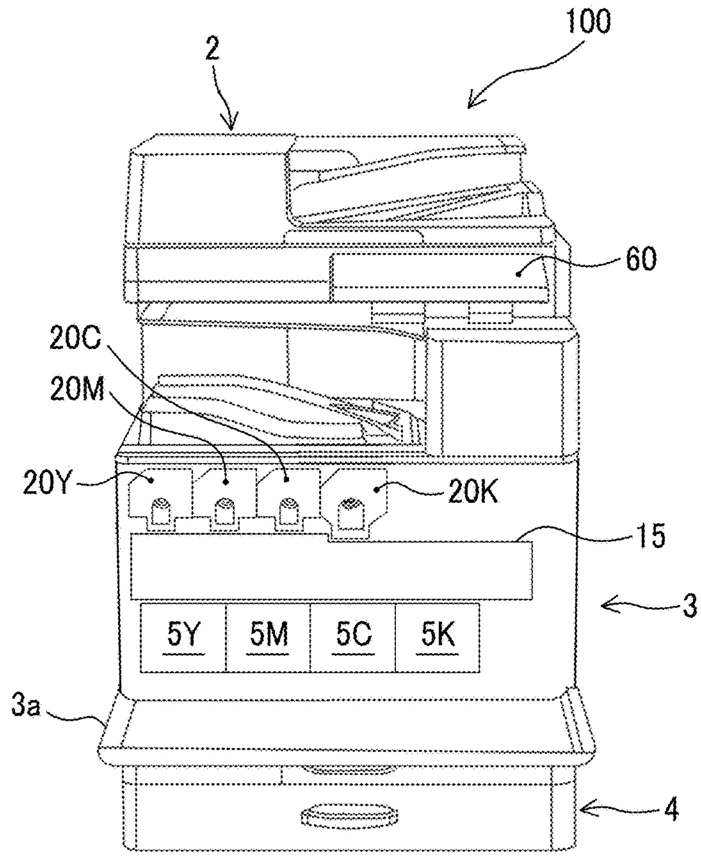
FIG. 2A is a front view of the image forming apparatus of FIG. 1 in which a front cover is opened.
Figure 2B:
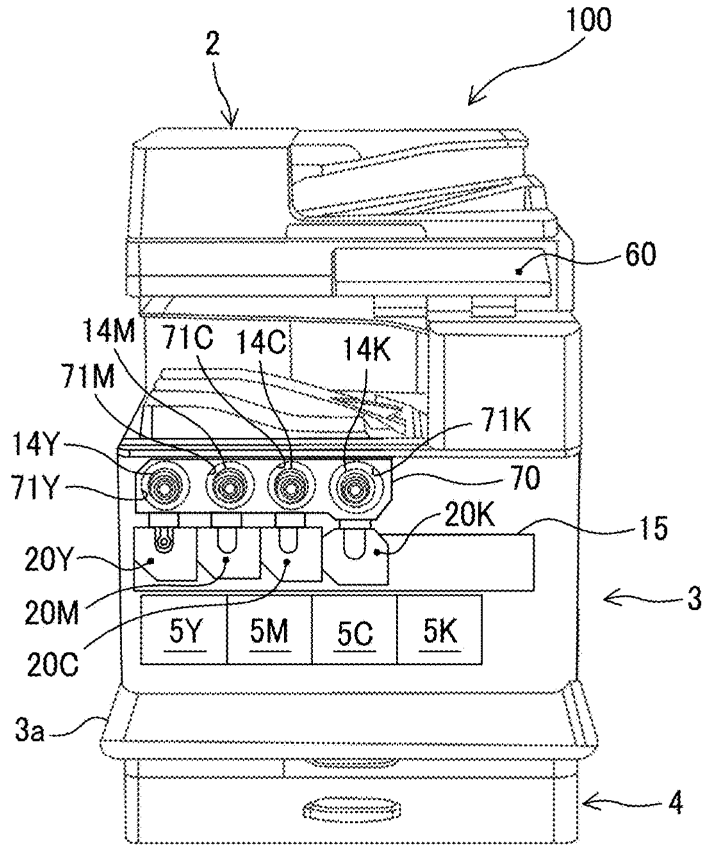
FIG. 2B is a front view of the image forming apparatus of FIG. 1 in which the front cover and bottle covers are opened.

FIG. 2A is a front view of the image forming apparatus 100 in which a front cover 3*a* as an outer cover is opened, and FIG. 2B is a front view of the image forming apparatus 100 in which the front cover 3*a* and bottle covers 20Y, 20M, 20C, and 20K as inner covers are opened.

As illustrated in FIG. 2A, the lower end of the front cover 3*a* as the outer cover is rotatably supported by the image forming section 3. Opening the front cover 3*a* exposes the intermediate transfer unit 15 and the image forming units 5Y, 5M, 5C, and 5K. As a result, the intermediate transfer unit 15 and the image forming units can be attached to and detached from the image forming apparatus 100.

In addition, opening the front cover 3*a* exposes the bottle covers 20Y, 20M, 20C, and 20K that open and close bottle insertion openings 71Y, 71M, 71C, and 71K of a bottle housing 70 of the image forming section 3. Opening the bottle covers 20Y, 20M, 20C, and 20K as the inner covers exposes the toner bottles 14Y, 14M, 14C, and 14K stored in the bottle housing 70 of the image forming section 3, and the toner bottles 14Y, 14M, 14C, and 14K can be attached to and detached from the bottle insertion openings 71Y, 71M, 71C, and 71K, respectively.

Lock devices 40 (see FIGS. 4A and 4B), which are described below, lock the bottle covers 20Y, 20M, 20C, and 20K at closed positions at which the bottle covers 20Y, 20M, 20C, and 20K cover the bottle insertion openings 71Y, 71M, 71C, and 71K, respectively. In response to toner depletion of any one of the yellow, magenta, cyan, and black toners in the toner bottles, the controller 50 controls the lock device to unlock the bottle cover corresponding to the toner depletion.

In the present embodiment, opening the front cover 3*a* exposes the bottle covers 20Y, 20M, 20C, and 20K, the intermediate transfer unit 15, and the image forming units 5Y, 5M, 5C, and 5K. Opening the front cover 3*a* enables opening and closing the bottle cover, inserting the intermediate transfer unit 15 and the image forming units 5Y, 5M, 5C, and 5K into an apparatus main body of the image forming apparatus 100, and pulling out the intermediate transfer unit 15 and the image forming units 5Y, 5M, 5C, and 5K from the apparatus main body. The above-described structure can reduce the number of covers from a structure in which opening front cover 3*a* exposes only the bottle cover. As a result, the above-described structure can reduce the number of components of the image forming apparatus and the cost of the image forming apparatus.

Figure 3:
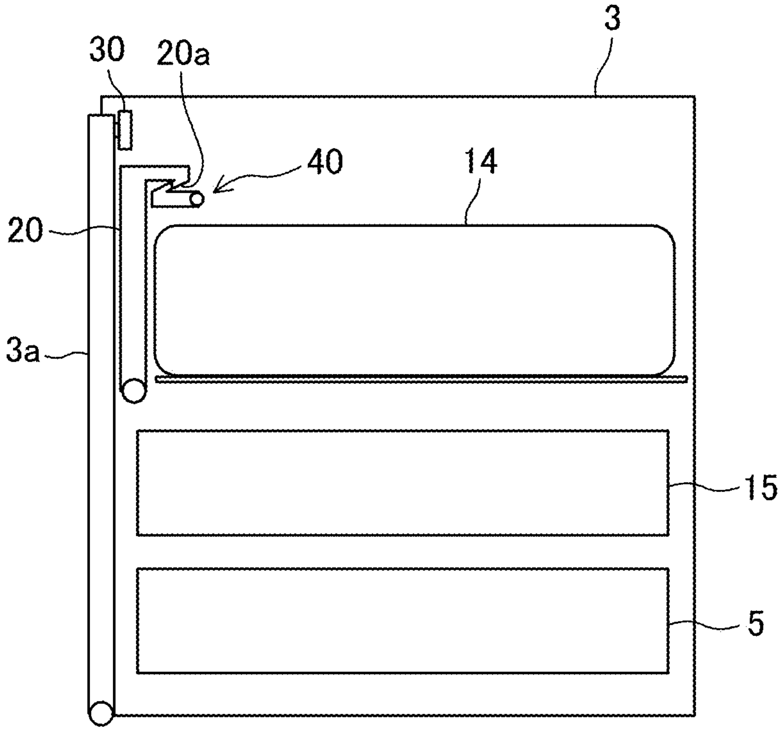
FIG. 3 is a schematic cross-sectional side view of an image forming section.

FIG. 3 is a schematic cross-sectional side view of the image forming section 3.

In the following description, color-coded symbols Y, M, C, and K are omitted as appropriate because the configurations of the bottle covers containing yellow toner, magenta toner, cyan toner, and black toner are the same.

As illustrated in FIG. 3, an interlock switch 30 as an opening-and-closing detector to detect whether the front cover 3*a* is opened or closed is disposed in an upper portion of the image forming section 3. In addition, the image forming section 3 includes lock devices 40 to lock the bottle covers 20 at the closed positions.

Figure 4A:
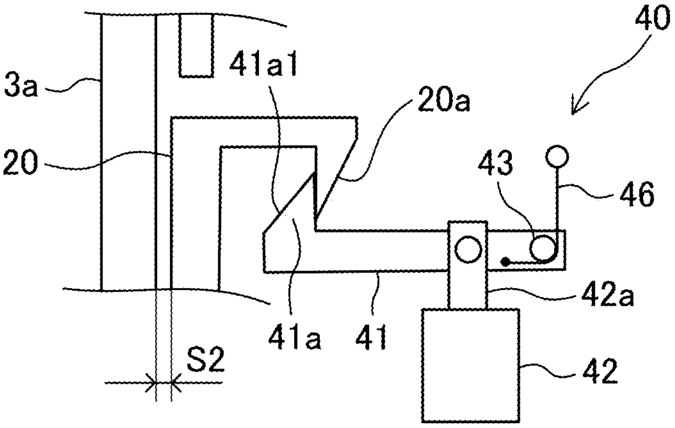
FIGS. 4A and 4B are schematic views of a configuration of a lock device.
Figure 4B:
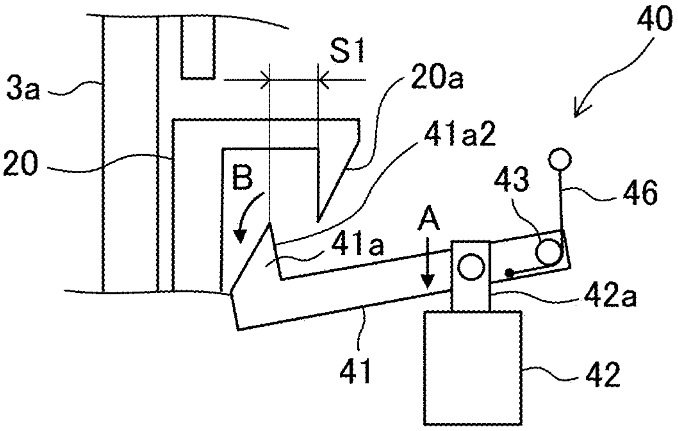

FIGS. 4A and 4B are schematic views of a configuration of the lock device 40.

The lock device 40 includes a solenoid 42 and a lock lever 41 including a lock claw 41*a* as a locking portion at a tip of the lock lever 41. The lock device 40 includes a support shaft 43 rotatably supporting the lock lever 41. The lock device 40 includes a torsion spring 46 serving as a biasing member attached to the support shaft 43. The torsion spring 46 applies a force to the lock lever 41 to be positioned at a lock position illustrated in FIG. 4A. The lock lever 41 is rotatably attached to a plunger 42*a* (a movable metallic core) of the solenoid 42.

As illustrated in FIG. 4A, the lock claw 41*a* of the lock lever 41 that locks the bottle cover 20 at the closed position faces a locked portion 20*a* in the bottle cover 20. At this time, the lock claw 41*a* is outside from the locked portion 20*a*. The lock claw 41*a* is closer to the front cover than the locked portion 20*a*. In the above-described structure, opening the bottle cover 20 causes the locked portion 20*a* to butt the lock claw 41*a*. In other words, a contact portion 41*a*2 of the lock claw 41*a* comes into contact with the locked portion 20*a*. As a result, the bottle cover 20 is locked at the closed position.

As illustrated in FIG. 4B, energizing the solenoid 42 generates an electromagnetic force pulling the plunger 42*a* in a direction indicated by an arrow A illustrated in FIG. 4B. The plunger 42*a* rotates the lock lever 41 in a direction indicated by an arrow B in FIG. 4B against the force applied by the torsion spring 46. As a result, the lock claw 41*a* of the lock lever 41 does not face the locked portion 20*a*, and the lock is released. Thus, the bottle cover 20 can be opened.

A biasing member such as a torsion spring biases the bottle cover 20 to an open position. After the lock is released, the biasing force of the biasing member automatically rotates the bottle cover 20 to the open position. However, the biasing member is unnecessary if the bottle cover 20 can be moved to the open position by its own weight.

Cutting off the energization of the solenoid 42 loses the electromagnetic force pulling the plungers 42*a*, and the force applied by the torsion spring 46 rotates the lock lever 41 clockwise in FIG. 4B to position the lock lever 41 at the lock position. Subsequently, closing the bottle cover 20 causes the locked portion 20*a* to butt against an inclined portion 41*al* of the lock claw 41*a* of the lock lever 41. Further closing the bottle cover 20 causes the lock lever 41 to rotate counterclockwise in FIGS. 4A and 4B and causes the lock claw 41*a* to climb over the locked portion 20*a*. As a result, the bottle cover 20 is positioned at the closed position. After the lock claw 41*a* climbs over the locked portion 20*a*, the force applied by the torsion spring 46 rotates the lock lever 41 clockwise in FIGS. 4A and 4B. As a result, the lock claw 41*a* faces the locked portion 20*a*, and the bottle cover 20 is locked.

Figure 5:
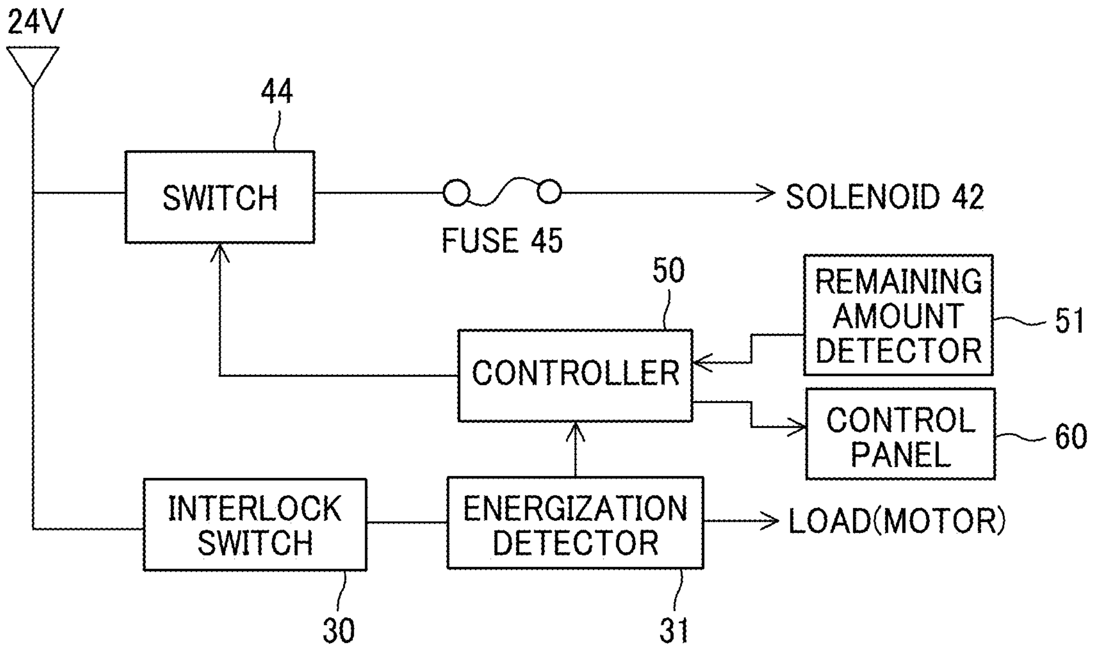
FIG. 5 is a block diagram of a circuit to drive a solenoid.

FIG. 5 is a block diagram of a circuit to drive the solenoid 42.

As illustrated in FIG. 5, the solenoid 42 is coupled to a 24V power supply via a switch 44 and a fuse 45. Opening the front cover 3*a* turns off the interlock switch 30 to cut off an electrical connection between the 24V power supply and a load (i.e., an electric component) such as a motor for the image forming section 3. Between the interlock switch 30 and the load, an energization detector 31 is disposed to detect whether a voltage is applied from the 24V power supply to the load such as the motor in the image forming apparatus. When opening the front cover 3*a* turns off the interlock switch 30, the energization detector 31 detects that no voltage is applied to the load (0V). As a result, the controller 50 can detect that the front cover 3*a* is opened. On the other hand, when closing the front cover 3*a* turns on the interlock switch 30, the energization detector 31 detects that the voltage is applied to the load. As a result, the controller 50 can detect that the front cover 3*a* is closed. As described above, the opening-and-closing detector in the present embodiment to detect whether the front cover 3*a* is opened or closed includes the interlock switch 30 and the energization detector 31.

Alternatively, the opening-and-closing detector to detect whether the front cover 3*a* is opened or closed may include, for example, a filler disposed on the front cover 3*a* and an optical sensor to detect the filler. Based on an output voltage from the optical sensor, the controller 50 may determine whether the front cover 3*a* is opened or closed. The opening-and-closing detector may include a magnet disposed on the front cover 3*a* and a magnetic sensor to detect a magnetic force of the magnet. Based on an output voltage from the magnetic sensor, the controller 50 may determine whether the front cover 3*a* is opened or closed. However, the interlock switch 30 to detect whether the front cover 3*a* is opened or closed has the following advantage. The opening-and-closing detector including the interlock switch 30 can reduce the number of components to be smaller than other opening and closing detectors including additional components to detect whether the front cover 3*a* is opened or closed. As a result, the cost of the image forming apparatus can be reduced.

The controller 50 is coupled to the energization detector 31, a remaining amount detector 51 that detects the amount of toner remaining in each of the toner bottles 14Y, 14M, 14C, and 14K, a control panel 60, and the switch 44 that turns on or off the energization of the solenoid 42.

The remaining amount detector 51 may use any one of various detection methods. For example, the remaining amount detector 51 may determine the amount of toner remaining in each of the toner bottles based on a calculation result of a toner consumption amount in each color image that can be calculated from a number of sheets printed and other factors. Alternatively, the remaining amount detector 51 may determine the amount of toner remaining in each of the toner bottles based on an electrostatic capacity in each of the toner bottles 14 or an electrostatic capacity in a toner conveyance path to convey each toner from the toner bottle 14 to the corresponding developing device.

The remaining amount detector 51 may use a toner supply system that supplies the toner to the developing device. For example, the toner supply system includes a toner concentration sensor detecting a toner concentration in developer in the developing device, and the controller supplies the toner to the developing device so that the toner concentration detected by the toner concentration sensor is in a target toner concentration range. Alternatively, the toner supply system may include an optical sensor detecting an image density of an image pattern formed on the photoconductor or the intermediate transfer belt, and the controller supplies the toner to the developing device so that the image density detected by the optical sensor is in a target image density range. When the toner density or the image density does not reach the target value although the toner is supplied by the above-described toner supply system, the controller can determine that the toner depletion occurs in the toner bottle. As described above, the remaining amount detector 51 may be formed.

The remaining amount detector 51 may use a toner remaining amount sensor assembled to a sub-hopper on the toner conveyance path between the toner bottle 14 and the corresponding developing device. The toner depletion in the toner bottle causes a decrease in an amount of toner in the sub-hopper. When the toner remaining amount sensor detects amounts of toner that each are equal to or smaller than an experimentally determined amount of toner for an experimentally determined time, the controller can determine that the toner depletion occurs in the toner bottle.

When the remaining amount detector 51 detects the toner depletion of any one of the yellow, magenta, cyan, and black toners in the toner bottles 14, the controller 50 controls the control panel 60 to display a notification indicating the toner bottle in which the toner depletion is detected and an instruction to replace the toner bottle with a new toner bottle 14. In addition, in response to the toner depletion detected by the remaining amount detector 51, the controller 50 determines whether the front cover 3*a* is opened based on detection results of the energization detector 31 that detects whether the interlock switch 30 is turned on or off. In response to determination that the front cover 3*a* is opened, the controller 50 turns on the switch 44. As a result, the 24V power supply supplies electric power to the solenoid 42 to open the lock of the bottle cover.

In the present embodiment, opening the front cover 3*a* turns off the interlock switch 30 but does not turn off the switch 44 to supply power to the solenoid 42. If the solenoid 42 causes a short circuit, an excessive current flows to the solenoid 42. The fuse 45 shuts off the excessive current to protect circuits in the apparatus main body.

Figure 6:
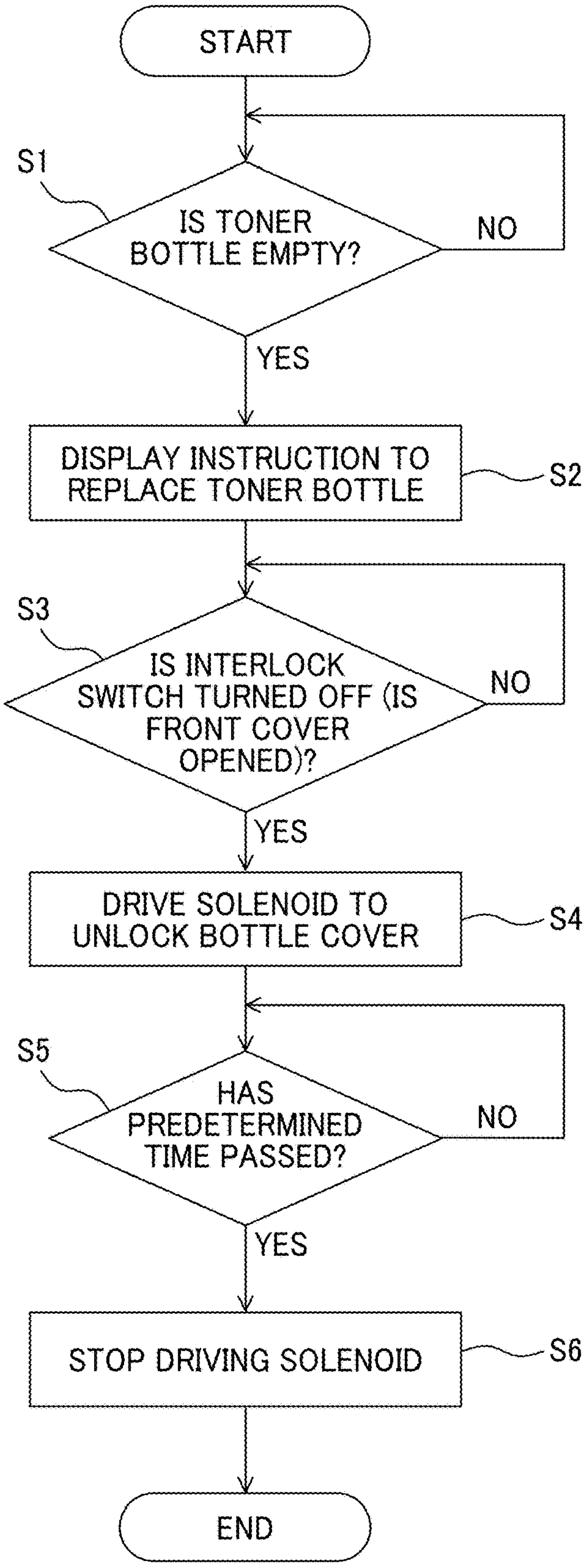
FIG. 6 is a flowchart of control to unlock the bottle cover.

FIG. 6 is a flowchart of control to unlock the bottle cover 20.

When the remaining amount detector 51 detects the toner depletion of any one of the yellow, magenta, cyan, and black toners in the toner bottles 14 (Yes in step S1), the controller 50 controls the control panel 60 to display the instruction to replace the toner bottle in which the toner depletion is detected with a new toner bottle 14 in step S2.

The user opens the front cover 3*a* to replace the toner bottle 14 with a new one. Opening the front cover 3*a* turns off the interlock switch 30, and the controller 50 detects that the front cover 3*a* has been opened (Yes in S3).

Figure 7:
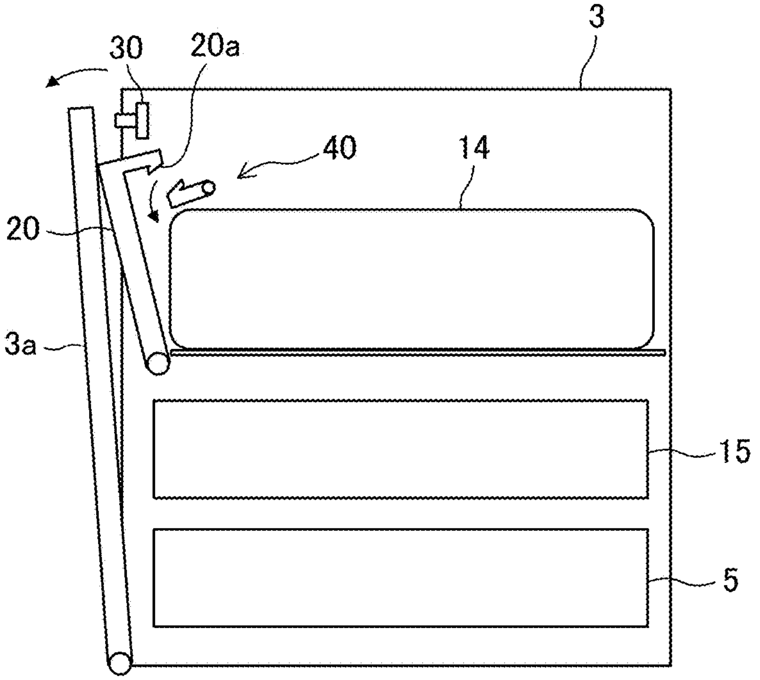
FIG. 7 is a schematic cross-sectional side view of the image forming section including the bottle cover and the front cover after toner depletion is detected.

After the controller 50 detects that the front cover 3*a* is opened, the controller 50 turns on the switch 44 to energize the solenoid 42 and drives the solenoid 42 in step S4. The driven solenoid 42 rotates the lock lever 41 to unlock the bottle cover 20 as described above. As a result, the above-described control opens the bottle cover 20 corresponding to the toner bottle 14 in which the toner depletion is detected together with the front cover 3*a* and exposes the toner bottle 14 in which the toner depletion is detected as illustrated in FIG. 7. Opening the bottle cover 20 corresponding to the toner bottle 14 in which the toner depletion is detected as described above enables the user to easily specify the toner bottle 14 to be replaced, and the replacement workability of the toner bottle 14 can be enhanced.

After the controller 50 turns on the switch 44 to start energization of the solenoid 42, the controller 50 starts measuring time. In response to the elapse of a predetermined amount of time (Yes in step S5), the controller 50 turns off the switch 44 to cut off the energization to the solenoid 42 and stop the driving of the solenoid 42 in step S6.

Figure 8A:
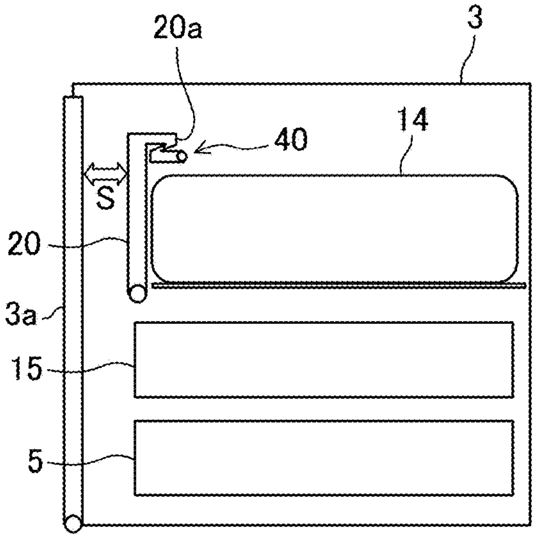
FIGS. 8A and 8B are schematic cross-sectional side views of an image forming section of an image forming apparatus according to a comparative example.
Figure 8B:
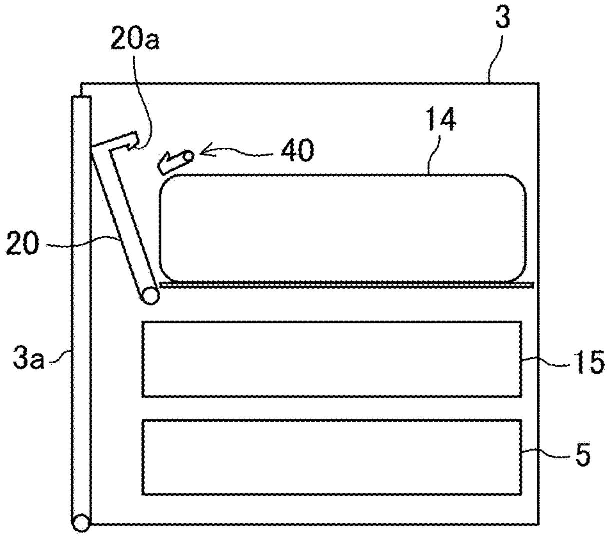

FIGS. 8A and 8B are schematic cross-sectional side views of an image forming section of an image forming apparatus according to a comparative example.

When the remaining amount detector 51 detects the toner depletion of any one of the yellow, magenta, cyan, and black toners in the toner bottles 14, the controller 50 according to the comparative example unlock the bottle cover 20 corresponding to the toner bottle 14 in which the toner depletion is detected even if the front cover 3*a* is closed. If a gap between the bottle cover 20 at the closed position and the front cover 3*a* at a closed position is narrower than a distance S1 between the locked portion 20*a* of the bottle cover 20 at the closed position and the contact portion 41*a*2 of the lock claw 41*a* of the lock lever 41 rotated to unlock the bottle cover 20 in the opening direction (see FIGS. 4A and 4B), the solenoid 42 needs to be energized to maintain unlocking the bottle cover 20 until the front cover 3*a* is opened. This is because the bottle cover 20 is hardly opened after the bottle cover 20 is unlocked, and the locked portion 20*a* is positioned upstream from the lock claw 41*a* in the opening direction. In the above-described positional relation, stopping the energization to the solenoid before the front cover 3*a* is opened causes the lock claw 41*a* disposed downstream from the locked portion 20*a* in the opening direction to face the locked portion 20*a*. As a result, the bottle cover 20 is locked again.

To avoid the above-described disadvantage, the image forming apparatus according to the comparative example is designed to have a gap S between the closed bottle cover 20 and the closed front cover 3*a* wider than the distance S1 between the locked portion 20*a* of the bottle cover 20 disposed at the closed position and the contact portion 41*a*2 of the lock claw 41*a* of the lock lever 41 rotated to unlock the bottle cover 20 as illustrated in FIG. 8A. Accordingly, unlocking the bottle cover 20 causes the bottle cover 20 to open to the position illustrated in FIG. 8B. The locked portion 20*a* is positioned downstream from the lock claw 41*a* in the opening direction. As a result, even if the energization of the solenoid 42 is stopped before the front cover 3*a* is opened, the lock claw 41*a* is not downstream from the locked portion 20*a*, and the bottle cover 20 is not locked. The above-described configuration does not need to continue the energization of the solenoid 42 to maintain unlocking the bottle cover until the front cover 3*a* is opened, which reduces power consumption.

However, the image forming apparatus according to the comparative example illustrated in FIGS. 8A and 8B requires increasing the gap between the front cover 3*a* and the bottle cover 20, which causes a disadvantage that the image forming apparatus becomes large.

In contrast, the image forming apparatus according to the present embodiment includes the energization detector 31 that detects whether the interlock switch 30 is turned on or off and the controller 50 that determines whether the front cover 3*a* is opened or closed based on a signal from the energization detector 31 as described by the flow chart illustrated in FIG. 6. When the controller 50 determines that the front cover 3*a* is opened based on the signal notifying that the interlock switch 30 is turned off, the controller 50 energizes the solenoid 42 to unlock the bottle cover 20. Unlocking the bottle cover 20 after the front cover 3*a* is opened as described above avoids locking the bottle cover 20 after the predetermined time passes and the energization of the solenoid 42 is stopped. In addition, as illustrated in FIGS. 4A and 4B, the image forming apparatus can be designed to have the gap S2 between the front cover 3*a* at the closed position and the bottle cover 20 at the closed position narrower than the distance S1 between the locked portion 20*a* in the bottle cover 20 at the closed position and the contact portion 41*a*2 of the lock claw 41*a* of the lock lever 41 rotated to unlock the bottle cover 20 (in other words, the contact portion of the lock craw as the locking portion unlocking the locked portion) in the opening direction. As a result, the image forming apparatus according to the present embodiment can be smaller than the image forming apparatus according to the comparative example illustrated in FIGS. 8A and 8B.

Generally, the closed bottle cover 20 and the closed front cover 3*a* can slightly move. The distance S1 and the gap S2 are measured when the bottle cover 20 and the front cover 3*a* are moved to be closed and strikes to the apparatus main body of the image forming apparatus 100. In other words, the closed position of the bottle cover 20 is defined as a position of the bottle cover 20 that is moved to be closed and strikes to the apparatus main body. The closed position of the front cover 3*a* is defined as a position of the front cover 3*a* that is moved to be closed and strikes to the apparatus main body. In the above-described configuration, the bottle cover is not locked again after the bottle cover is unlocked even when the gap S2 defined as described above is designed to be smaller than the distance S1 defined as described above.

Figure 9:
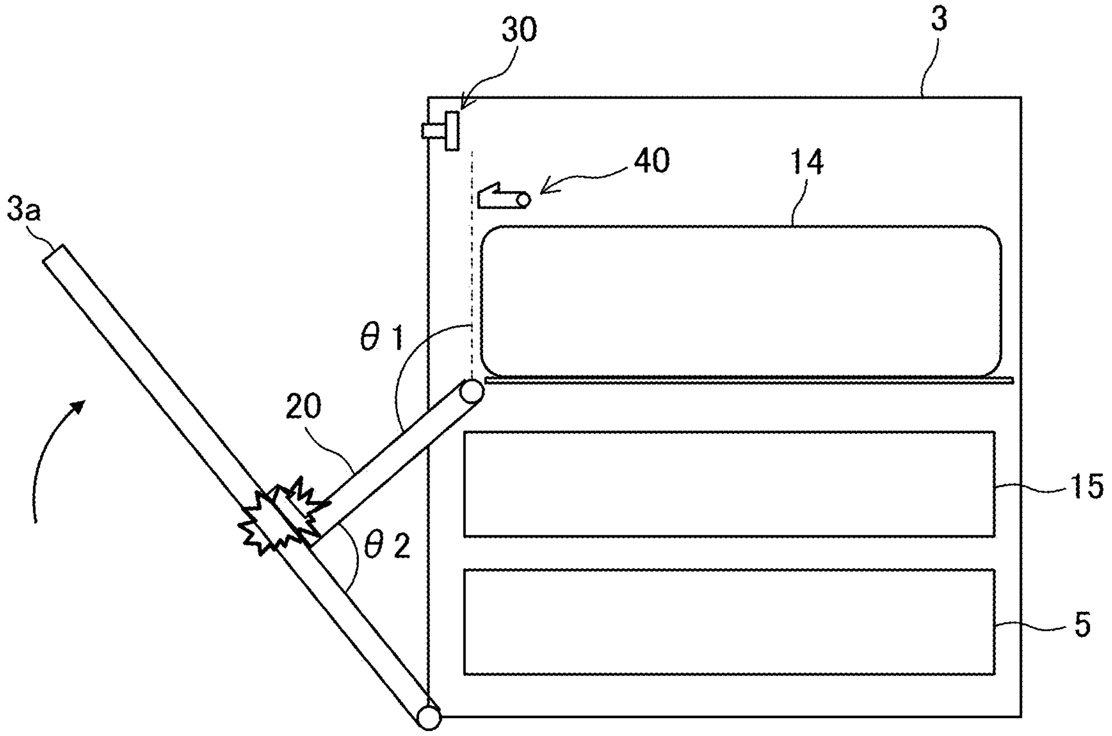
FIG. 9 is a schematic cross-sectional side view of the image forming section with the bottle cover at the open position.

FIG. 9 is a schematic cross-sectional side view of the image forming section with the bottle cover 20 at the open position.

In the present embodiment, an opening angle θ1 of the bottle cover 20 at the open position is 90° or more. The above-described structure can prevent the bottle cover 20 from interfering with the replacement of the toner bottle 14 and enables easy replacement of the toner bottle 14. In addition, as illustrated in FIG. 9, closing the front cover 3*a* when the bottle cover 20 is not closed causes the front cover 3*a* to butt against the bottle cover 20. The front cover 3*a* cannot be closed. Thus, the above-described configuration can prevent the operator from forgetting to close the bottle cover 20.

Preferably, the opening angle of the bottle cover 20 is designed so that the angle θ 2 formed by the front cover 3*a* and the bottle cover 20 when the front cover 3*a* butts against the bottle cover 20 at the open position is 90°. As a result, a force applied to the bottle cover 20 when the front cover 3*a* collides with the bottle cover 20 is substantially an axial force, which prevents bending deformation of the bottle cover 20.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The configurations according to the above-descried embodiments are examples, and embodiments of the present disclosure are not limited to the above. For example, the following aspects can achieve effects described below.

(First Aspect)

In a first aspect, an image forming apparatus such as the image forming apparatus 100 includes a unit such as the image forming unit 5 or the intermediate transfer unit 15, a housing such as the bottle housing 70, an outer cover such as the front cover 3*a*, a lock such as the lock device 40, a detector such as the remaining amount detector 51, and circuitry such as the controller 50. The unit is disposed in the image forming apparatus. The housing stores a toner bottle such as the toner bottle 14 and has an insertion opening such as the bottle insertion opening 71, and an inner cover such as the bottle cover 20 openably closable the insertion opening. The outer cover is openably closable to expose the inner cover and the unit or cover the inner cover and the unit. The lock locks the inner cover at a closed position. The detector detects an amount of toner remaining in the toner bottle. The circuitry controls the lock to unlock the inner cover based on the amount of the toner detected by the detector.

As described in the present embodiment, the image forming apparatus according to the first aspect includes the outer cover such as the front cover 3*a*, and opening the outer cover exposes the inner cover and the unit in the body of the image forming apparatus. The number of the covers in the image forming apparatus according to the first aspect is smaller than the number of the covers in an image forming apparatus including an outer cover covering the inner cover and a cover covering the unit in the body of the image forming apparatus separately. As a result, the above-described structure can reduce the number of components of the image forming apparatus and the cost of the image forming apparatus.

(Second Aspect)

In a second aspect, the image forming apparatus according to the first aspect further includes an another detector such as the interlock switch 30 to detect an opening of the outer cover such as the front cover 3*a* from the closed position, and the circuitry unlocks the inner cover based on the amount of the toner detected by the detector such as the remaining amount detector 51 and the opening of the outer cover detected by the another detector.

As described in the present embodiment, the configuration according to the second aspect does not lock the inner cover such as the bottle cover 20 after the circuitry stops the energization to the solenoid 42 to stop the lock release in response to the elapse of the predetermined time. As a result, the gap between the inner cover and the outer cover such as the front cover 3*a* in the image forming apparatus according to the second aspect can be designed to be smaller than that in the image forming apparatus according to the comparative example illustrated in FIG. 8, which prevents the size of the image forming apparatus from increasing.

(Third Aspect)

In a third aspect, the lock such as the lock device 40 in the image forming apparatus according to the second aspect includes a locking portion such as the lock claw 41*a* and a locked portion such as the locked portion 20*a* in the inner cover such as the bottle cover 20. The locked portion is locked by the locking portion. The locking portion is downstream from the locked portion of the inner cover at the locked position in an opening direction of the inner cover and includes a contact portion to contact with the locked portion of the inner cover at the closed position. A gap between the inner cover at the closed position and the outer cover at a closed position, such as the gap S2 is smaller than a distance, in the opening direction of the inner cover, between the locked portion of the inner cover at the closed position and the contact portion of the locking portion unlocking the locked portion, such as the gap S1.

As described in the present embodiment, the image forming apparatus according to the third aspect can be designed to be smaller than the image forming apparatus according to the comparative example in which the gap S2 between the closed inner cover and the closed outer cover such as the front cover 3*a* is larger than the distance S1 between the locked portion in the inner cover disposed at the closed position and the contact portion of the locking portion of the lock unlocked in the direction in which the inner cover is opened.

(Fourth Aspect)

In a fourth aspect, the lock such as the lock device 40 in the image forming apparatus according to the second aspect or the third aspect includes a solenoid such as the solenoid 42 energized to unlock the inner cover, and the circuitry is configured to energize the solenoid to unlock the inner cover and stop energization of the solenoid after an elapse of a predetermined time after an unlock of the inner cover.

The image forming apparatus according to the fourth aspect can reduce power consumption to be smaller than the power consumption of the image forming apparatus that continues the energization of the solenoid to maintain unlocking the bottle cover until the front cover is opened.

(Fifth Aspect)

In a fifth aspect, the image forming apparatus according to any one of the second to fourth aspects further includes an electric component, and the another detector includes an interlock switch such as the interlock switch 30 to cut off energization of the electric component in response to an opening of the outer cover such as the front cover 3*a*.

The image forming apparatus according to the fifth aspect can be designed to have a smaller number of components than an image forming apparatus including a switch to cut off energization of the electric component in response to opening the outer cover such as the front cover and a sensor to detect opening and closing of the outer cover. As a result, the cost of the image forming apparatus can be reduced.

(Sixth Aspect)

In a sixth aspect, the image forming apparatus according to any one of the first to fifth aspects further includes a fuse such as the fuse 45, and the lock such as the lock device 40 includes a solenoid such as the solenoid 42 that receives power via the fuse to unlock the inner cover.

According to the sixth aspect, as described in the present embodiment, the fuse can shut off the excessive current caused by the short circuit of the solenoid to protect the circuits in the apparatus main body.

(Seventh Aspect)

In a seventh aspect, an opening angle of the inner cover such as the bottle cover 20 in the image forming apparatus according to any one of the first to sixth aspects is 90° or more.

As described in the present embodiment with reference to FIG. 9, the configuration according to the seventh aspect can prevent the inner cover such as the bottle cover 20 from colliding with the toner bottle 14 to be replaced and enables easily replacing the toner bottle. In addition, closing the outer cover such as the front cover 3*a* when the inner cover is not closed causes the outer cover to butt against the inner cover, and the outer cover cannot be closed. As a result, the user can notice that the inner cover is not closed.

(Eighth Aspect)

In an eighth aspect, the circuitry in the image forming apparatus according to the first aspect unlocks the inner cover based on the amount of the toner detected by the detector, and the lock such as the lock device 40 includes a locking portion such as the lock claw 41*a* and a locked portion such as the locked portion 20*a* in the inner cover such as the bottle cover 20. The locked portion is locked by the locking portion. The locking portion is downstream from the locked portion of the inner cover at the closed position in an opening direction of the inner cover and includes a contact portion to contact with the locked portion of the inner cover at the closed position. A gap between the inner cover at the closed position and the outer cover at a closed position, such as the gap S2 is larger than a distance, in the opening direction of the inner cover, between the locked portion of the inner cover at the closed position and the contact portion of the locking portion unlocking the locked portion, such as the gap S1.

(Ninth Aspect)

In an eighth aspect, an image forming apparatus such as the image forming apparatus 100 includes a housing such as the bottle housing 70, an outer cover such as the front cover 3*a*, a lock such as the lock device 40, a detector such as the remaining amount detector 51, an another detector such as the interlock switch 30, and circuitry such as the controller 50. The housing stores a toner bottle such as the toner bottle 14 and has an insertion opening such as a bottle insertion opening 71 and an inner cover such as the bottle cover 20 openably closable the insertion opening. The lock locks the inner cover at a closed position. The lock includes a locked portion such as the locked portion 20*a* and a locking portion such as the lock claw 41*a*. The locked portion is locked by the locking portion. The locking portion is downstream from the locked portion of the inner cover at the closed position in an opening direction of the inner cover. The locking portion includes a contact portion to contact with the locked portion of the inner cover at the closed position. The detector detects an amount of toner remaining in the toner bottle. The another detector detects an opening of the outer cover from the closed position. The circuitry controls the lock to unlock the inner cover based on the amount of the toner detected by the detector and the opening of the outer cover detected by the another detector. A gap between the inner cover at the closed position and the outer cover at a closed position is smaller than a distance, in the opening direction of the inner cover, between the locked portion of the inner cover at the closed position and the contact portion of the locking portion unlocking the locked portion.

As described in the present embodiment, the configuration according to the eighth aspect can prevent the size of the image forming apparatus from increasing and reduce power consumption.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:
a unit disposed in the image forming apparatus;
a housing to store a toner bottle, the housing having:
an insertion opening; and
an inner cover openably closable the insertion opening;
an outer cover openably closable to expose the inner cover and the unit or cover the inner cover and the unit;
a lock to lock the inner cover at a closed position;
a detector to detect an amount of toner remaining in the toner bottle; and
circuitry configured to control the lock to unlock the inner cover based on the amount of the toner detected by the detector.

2. The image forming apparatus according to claim 1, further comprising
an another detector to detect an opening of the outer cover from the closed position,
wherein the circuitry unlocks the inner cover based on:
the amount of the toner detected by the detector; and
the opening of the outer cover detected by the another detector.

3. The image forming apparatus according to claim 2, wherein the lock includes:
a locking portion; and
a locked portion in the inner cover, the locked portion locked by the locking portion,
the locking portion is downstream from the locked portion of the inner cover at the closed position in an opening direction of the inner cover,
the locking portion includes a contact portion to contact with the locked portion of the inner cover at the closed position, and
a gap between the inner cover at the closed position and the outer cover at a closed position is smaller than a distance, in the opening direction of the inner cover, between the locked portion of the inner cover at the closed position and the contact portion of the locking portion unlocking the locked portion.

4. The image forming apparatus according to claim 2, wherein the lock includes a solenoid energized to unlock the inner cover, and
the circuitry is configured to:
energize the solenoid to unlock the inner cover; and
stop energization of the solenoid after an elapse of a predetermined time after an unlock of the inner cover.

5. The image forming apparatus according to claim 2, further comprising
an electric component,
wherein the another detector includes an interlock switch to cut off energization of the electric component in response to an opening of the outer cover.

6. The image forming apparatus according to claim 1, further comprising
a fuse,
wherein the lock includes a solenoid to receive power via the fuse to unlock the inner cover.

7. The image forming apparatus according to claim 1, wherein an opening angle of the inner cover is 90° or mom.

8. The image forming apparatus according to claim 1, wherein the circuitry unlocks the inner cover based on the amount of the toner detected by the detector,
the lock includes:
a locking portion; and
a locked portion in the inner cover,
the locked portion locked by the locking portion,
the locking portion is downstream from the locked portion of the inner cover at the closed position in an opening direction of the inner cover,
the locking portion includes a contact portion to contact with the locked portion of the inner cover at the closed position, and a gap between the inner cover at the closed position and the outer cover at a closed position is larger than a distance, in the opening direction of the inner cover, between the locked portion of the inner cover at the closed position and the contact portion of the locking portion unlocking the locked portion.

9. An image forming apparatus comprising:

a housing to store a toner bottle, the housing having:

an insertion opening; and an inner cover openably closable the insertion opening;

an outer cover openably closable to expose the inner cover or cover the inner cover;

a lock to lock the inner cover at a closed position, the lock including:

a locking portion; and a locked portion in the inner cover, the locked portion locked by the locking portion, the locking portion downstream from the locked portion of the inner cover at the closed position in an opening direction of the inner cover, the locking portion including a contact portion to contact with the locked portion of the inner cover at the closed position;

a detector to detect an amount of toner remaining in the toner bottle;

an another detector to detect an opening of the outer cover from the closed position; and circuitry configured to control the lock to unlock the inner cover based on the amount of the toner detected by the detector and the opening of the outer cover detected by the another detector, wherein a gap between the inner cover at the closed position and the outer cover at a closed position is smaller than a distance, in the opening direction of the inner cover, between the locked portion of the inner cover at the closed position and the contact portion of the locking portion unlocking the locked portion.

* * * * *